United States Patent [19]

Carroll, Jr.

[11] Patent Number: 5,007,608
[45] Date of Patent: Apr. 16, 1991

[54] TELEVISION WALL BRACKET

[75] Inventor: Joseph W. Carroll, Jr., West Chester, Pa.

[73] Assignee: Kim Manufacturing Company, Downingtown, Pa.

[21] Appl. No.: 399,172

[22] Filed: Aug. 28, 1989

[51] Int. Cl.$^5$ .............................................. A47F 1/10
[52] U.S. Cl. ............................. 248/297.2; 248/297.1; 248/297.3; 248/917
[58] Field of Search .................. 248/297.3, 297.2, 917, 248/919, 222.1, 225.1, 282, 297.1

[56] References Cited

U.S. PATENT DOCUMENTS

| | | | |
|---|---|---|---|
| 321,887 | 7/1885 | Cross | 248/297.3 X |
| 622,778 | 4/1899 | Nordyke | 248/297.2 X |
| 876,197 | 1/1908 | Knab | 248/297.3 X |
| 1,462,240 | 7/1923 | Moss | 248/297.3 X |
| 3,078,484 | 2/1963 | Briggs | 248/297.3 X |
| 4,025,017 | 5/1977 | Miller | 248/297.1 |
| 4,170,335 | 10/1979 | King | 248/297.2 X |
| 4,487,389 | 12/1984 | Ziegler | 248/282 |
| 4,508,302 | 4/1985 | Haüsser | 248/297.3 |
| 4,568,050 | 2/1986 | Radoy et al. | 248/297.2 X |
| 4,786,081 | 11/1988 | Schmidt | 248/297.3 X |

FOREIGN PATENT DOCUMENTS 2368812  6/1978  France ............................. 248/297.3

Primary Examiner—David L. Talbott
Assistant Examiner—Daniel Hulseberg
Attorney, Agent, or Firm—Eugene E. Renz, Jr.

[57] ABSTRACT

A wall mounting device for attaching a television set to a wall. The device includes a tray having a base for mounting the television set thereon. The base is attached to one end of a support arm which extends generally horizontally away from the tray to the other end of the arm. A slide assembly is attached to the other end of the arm and includes a vertical "s" shaped angled member having a lower flat portion parallel to the wall, a middle pivot portion and a upper flat portion parallel to and spaced from the wall. A bracket is provided which extends vertically along the wall to which it is attached. The bracket includes a back plate and a pair of confronting u-shaped side flanges extending from the back plate to present a pair of vertical inner track surfaces which are spaced from the wall such that said lower flat portion and the pivot portion of the slide assembly contact the back plate when the upper portion of the slide assembly is in contact with the inner track surfaces. Locking means are provided to prevent vertical movement of the slide assembly when the lower portion of the assembly is in contact with the back plate.

11 Claims, 3 Drawing Sheets

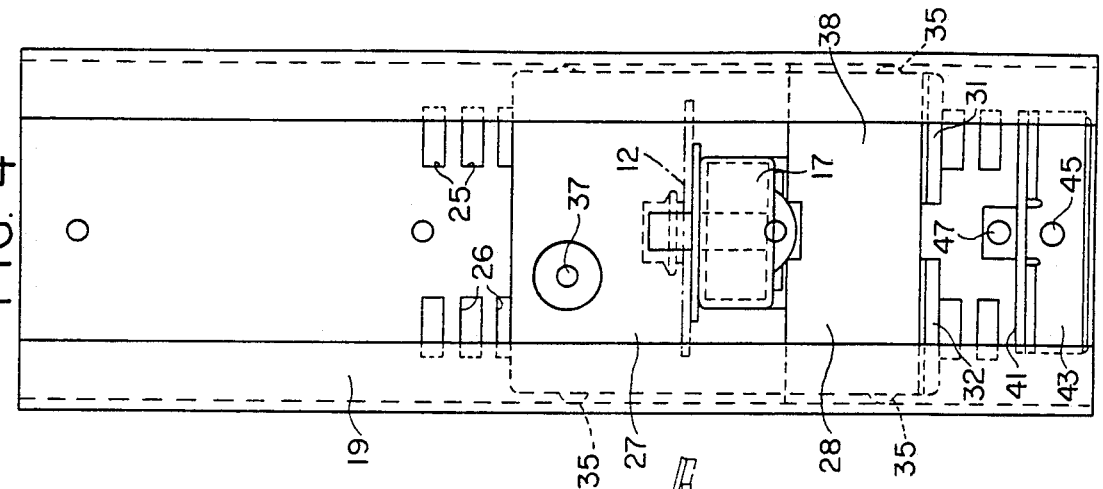
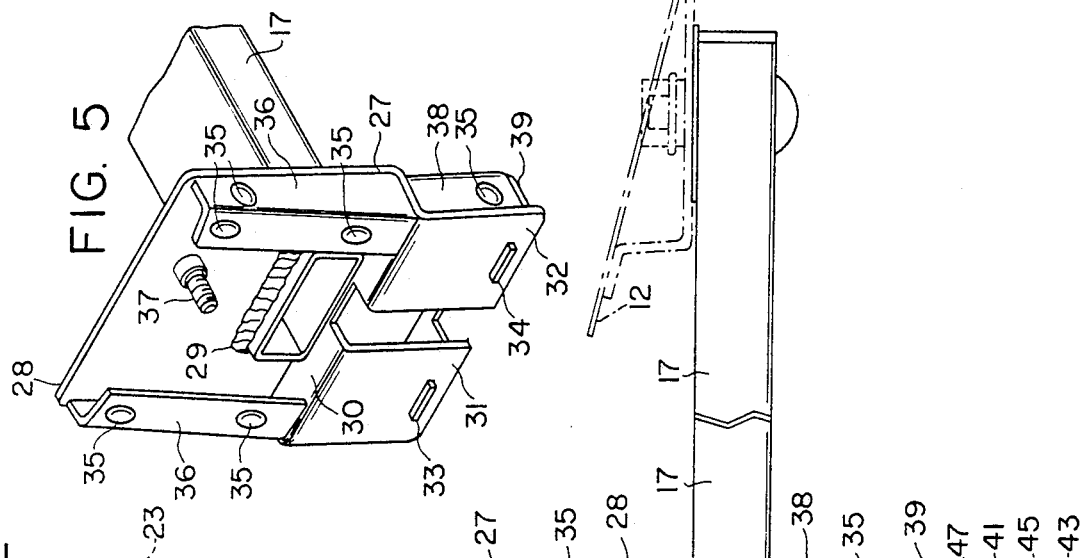
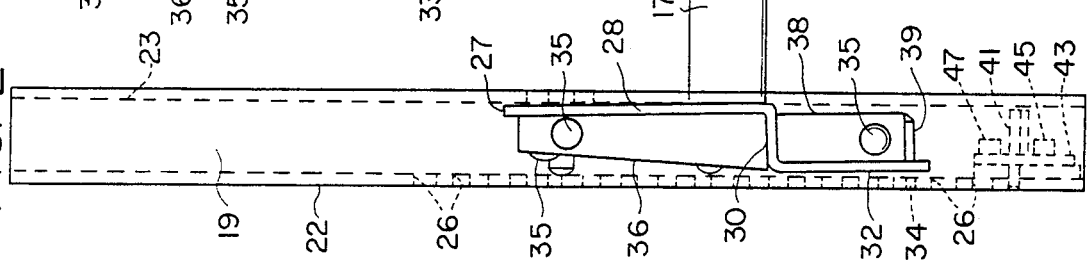
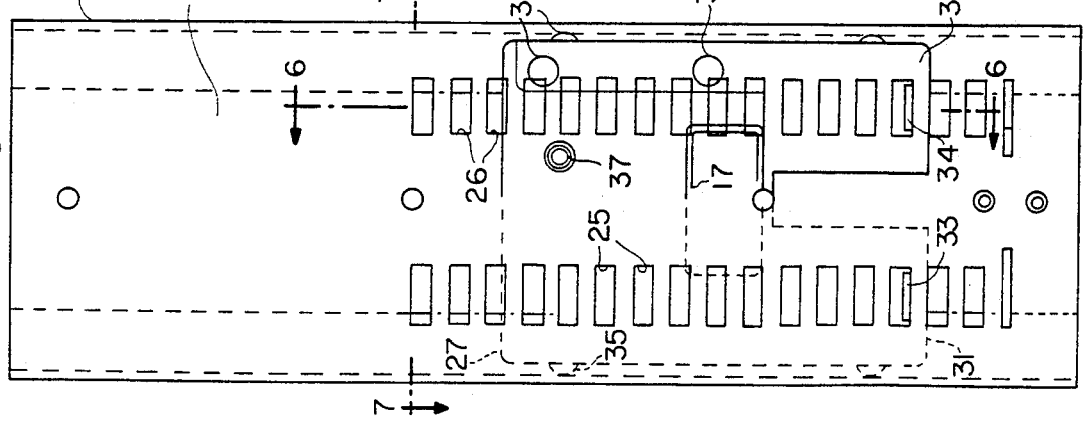

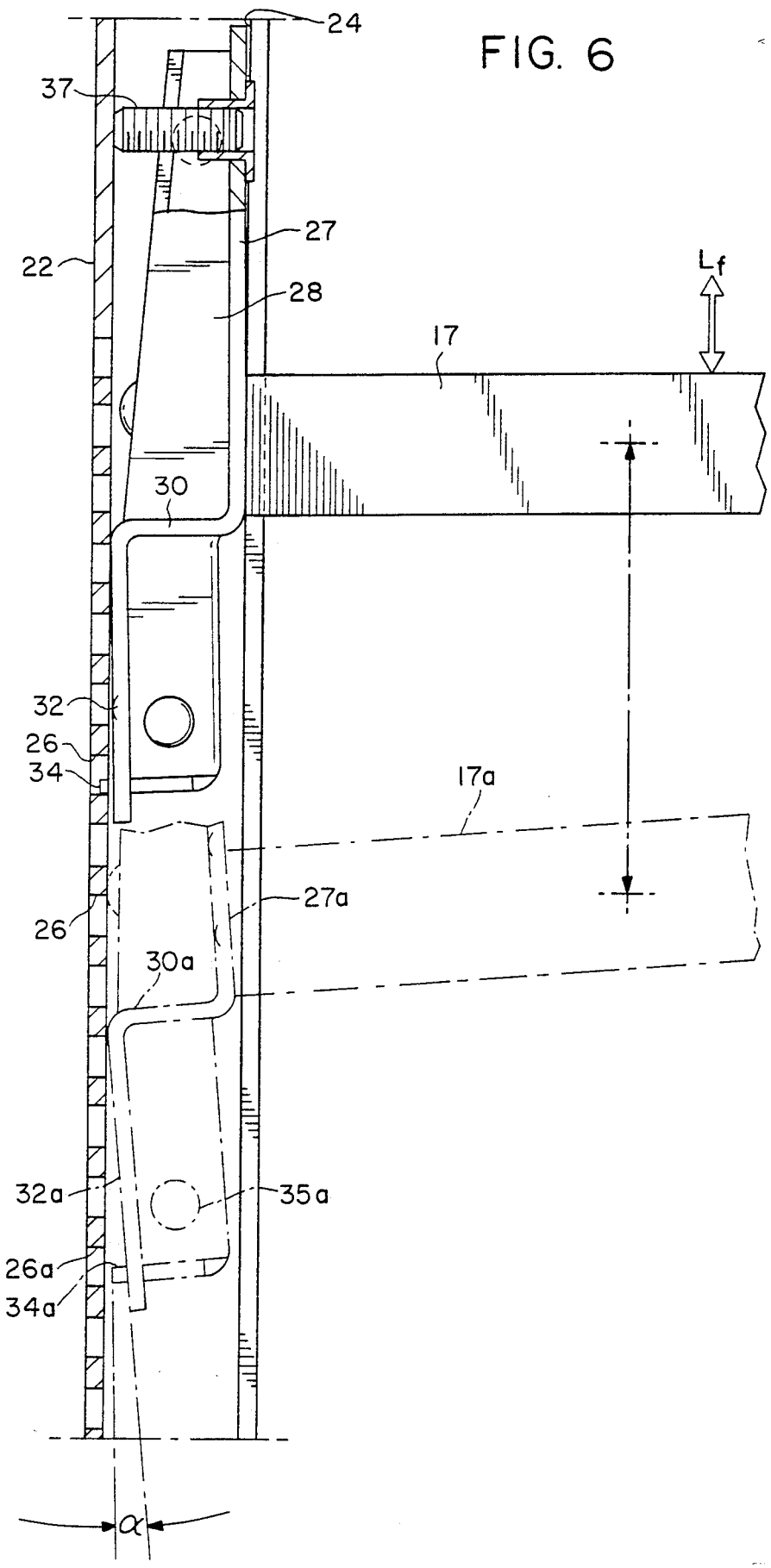

TELEVISION WALL BRACKET

FIELD OF THE INVENTION

The present invention relates to support assemblies or the like and/or particularly to a new and useful improvements in wall mounted stands for television sets and the like.

BACKGROUND OF THE INVENTION

The wall mounted television bracket of the present invention has particular application and use in establishments accommodating the public such as hotels, hospitals and the like. It has been found that there is a large risk of property loss, particularly in hotels, unless the television sets which have been provided onsite as an accommodation to clientele are properly secured. A typical security device in the form of a floor mounted stand is shown in my prior patent entitled television stand, U.S. Pat. No. 4,363,460, issued Dec. 14, 1982. Television security stands and the like are, of course, not new per se and even though my patented stand is effective for the purposes intended, certain features could be improved. A floor stand can be rather bulky and present certain obstacles when the room is being cleaned, since the unit is bolted to the floor. This presents a problem in effectively cleaning the area around the television set. Furthermore, the unit is not adjustable in height even though this is a desirable feature for television support assemblies or the like. Particularly in hospitals, clear floor areas are needed at times to optimize the use of space and it would be desirable to be able to position the television set for easy access to the patent and yet be able to remove it when the patients needs require it. In hotels and motels, a wall mounted unit is particularly desirable to facilitate cleaning so that the maids can be in and out of a room without the delay caused by moving furniture or having to clean around a stand.

With the foregoing in mind, an object of the present invention is to provide a wall mounted bracket for television sets or the like, which bracket is of a comparatively simplified design consisting of relatively few parts which may be assembled easily and economically and which include novel means permitting height adjustment of the television set by simple manipulation. It is an object of this invention to provide a mounting bracket which is at least theft resistant. Other objects will appear hereinafter.

SUMMARY OF THE INVENTION

It has now been discovered that the above and other objects of the present invention may be accomplished in the following manner. Specifically, an improved mounting device for attaching television sets to walls has been developed. The television rests upon a tray in such a way so as to prevent access to the fastening mechanism. One method for mounting the television is described in my prior patent U.S. Pat. No. 4,363,460.

The tray is fastened to a support arm. The support arm extends generally horizontally away from the tray and has a slide assembly fixedly attached at its other end. The slide assembly includes a generally vertical s-shaped angle member which has a lower flat portion adjacent to the wall, a middle pivot portion and an upper flat portion which is spaced from the wall. An elongated wall bracket is adapted to receive the slide assembly. The bracket extends vertically along and is attached to the wall. The bracket includes an elongated back plate which rests against the wall and a pair of u-shaped flanges extending from opposite side edges of the back plate to define a pair of vertical inner track surfaces which are spaced from the back plate by a predetermined distance. That distance permits the lower flat portion and the pivot portion of the slide assembly to contact the back plate at the time when the upper portion of the slide assembly is in contact with the inner track surface. When the upper portion is moved away from the inner track surface by pivoting around the pivot point, the lower portion also moves away from the back plate. Finally, the wall bracket and the slide assembly have a cooperative locking means for preventing vertical movement of the slide assembly when the lower portion of the slide assembly is in contact with the back plate.

BRIEF DESCRIPTION OF THE DRAWINGS

A more detailed understanding of the invention and the objects of the present invention with the various features and details of the operation and construction thereof, are hereinafter more fully set forth with reference to the accompanying drawings, wherein:

FIG. 2 is a side elevational view thereof;

FIG. 3 is a back view of the wall mounted bracket;

FIG. 4 is a front elevational view thereof;

FIG. 5 is a fragmentary perspective view of the slide assembly; and

FIGS. 6 and 7 are enlarged sectional views taken on lines 6—6 and 7—7 respectively of FIG. 3.

DETAILED DESCRIPTION OF THE PREFERRED EMBODIMENT

Figure 1:
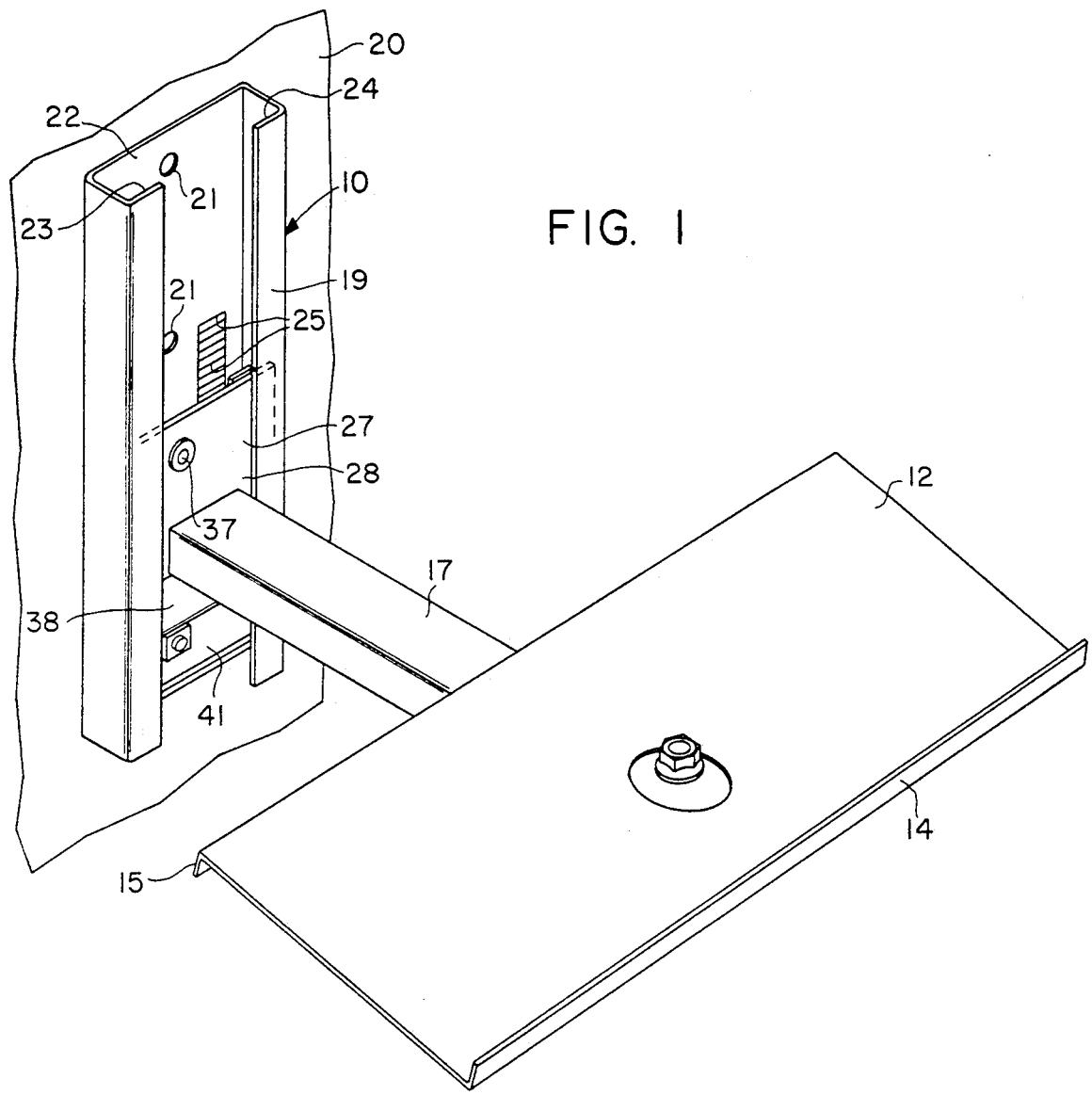
FIG. 1 is a perspective view of a wall mounted bracket and incorporating features of the present inventions.

Referring now to the drawing and particularly of FIG. 1 thereof, there is shown a wall bracket particularly adapted for use as a television stand made in accordance with the present invention and generally designated by the numeral 10. As illustrated, the base 12 of the tray has a retaining flange 14. The television set may be fixedly mounted in accordance with tamper proof technology such as that shown in my prior U.S. Pat. No. 4,363,460.

The tray base 12 is mounted on a support arm 17 which is a rectangular bar generally horizontal in orientation. The arm 17 extends from the tray mounted on the outer terminal end of the arm to the other end of the arm 17 having its inner terminal end welded to bracket 28. The support arm fits into the channel member shown generally by the numeral 19 via a slide assembly as described hereinafter. The channel member 19 is mounted to wall 20 through fastening means 21 and comprises a back plate 22 and a pair of side flanges extending from the back plate to present a pair of vertically oriented confronting inner track surfaces 23 and 24. Also contained on back plate 22 are two rows slots 25 and 26 which extend side by side from the highest to the lowest vertical height at which the television set will be located.

Attached to the support arm 17 at its inner terminal end is an angle or s-shaped member 27 which forms a part of the slide assembly shown generally by the reference numeral 28. As shown in FIG. 5, the angle member 27 is welded to the support arm 17 via welds 29 or other means for rigidly fastening the two pieces together. It has been found that with the rectangular construction of arm 17, a weld at the junction between the arm 17 and the angled s-shaped member 27 provides a rigid and effective support. This welded junction is capable of carrying the weight of the television set which is mounted at the other end of arm 17 on the base 12.

The angled piece 27 of the slide assembly 28 is fastened to the arm 17 in a perpendicular relationship, so that when the arm 17 is horizontal, the outer face of the plate 27 is generally vertical. Extending from the upper portion of 27 to form the "s" shape is a horizontal web 30 and a pair of lower depending flange portions 31 and 32 which extend generally parallel to the plane of the upper portion 27 and therefore are generally perpendicular to the horizontal plane in which arm 17 normally resides. Accordingly, lower portions 31 and 32 of the slide assembly 28 are parallel to the wall 20 and the back plate 22. A pair of tabs 33 and 34 are located on lower portions 31 and 32 of the slide assembly and are sized and positioned to fit into the slots 25 and 26. As is shown in FIG. 2, when the arm 17 approaches a horizontal position, upper portion 27 comes into contact with the inner track surfaces 23 and 24 and becomes substantially parallel to the wall 20. As the slide assembly pivots about the pivot point of the junction of the bend 30 and flat portions 31 and 32, flat portions 31 and 32 come into parallel contacting relationship with the back plate 22 and tabs 33 and 34 fit into the particular slots in the rows of slots 25 and 26.

The slide assembly 28 may be inserted into the wall bracket from either the top or the bottom during installation. Bracket 19 may be fixed to the wall 20 through fastening means 21, such that the top of the bracket is close enough to the ceiling to prevent removal of the slide assembly 28 without removal of the television set from the tray 12. At the bottom of the elongated bracket 19, a ledge 41 is fastened through bracket 43 and bolt assemblies 45 and 47 so that in the event that tabs 33 and 34 are not locking the slide assembly into position in slots 25 and 26, the slide assembly 28 will not drop through the channel member 19. This ledge 41 provides both a safety and a security feature.

As shown in FIG. 5, the slide assembly 28 includes a plurality of button like bumpers 35 which may be made of plastic or other relatively frictionless material so as to provide a riding surface when the slide assembly moves. Bumper support side flanges 36 are attached to the upper portion 27 and are slanted at and angle with respect to the vertical, so that arm 17 is moved out of horizontal by lifting the end which base 12 is attached, the upper portion 27 moves out of vertical and away from contact with the inner track surfaces 23 and 24 of the shaped flanges. Flanges 36 then contact the back plate 22 of the bracket and plastic bumpers 35 permit easy sliding of the slide assembly to a new desired position. It is noted that the plastic bumpers 35 contact the back plate 22 along a line outside of the vertical rows of slots 25 and 26. The rows of slots 25 and 26 are aligned with the position of tabs 33 and 34 on lower portions 31 and 32. Lower flanges 31 and 32 are also bridged by bracket 38 having a lower flange 39, having rectangular extensions that pierce flanges 31 and 32 forming tabs 33 and 34 in addition bracket 38 will increase the rigidity of the structure and its load bearing cooperative engagement with slots 25 and 26.

As shown in FIG. 6, when the arm 17 is horizontal, the flange 30 is also horizontal and lower plate 32 becomes parallel with the back plate 22 so that tab 34 can be inserted into slot 26. In this condition, the slide assembly cannot be lowered. In order to secure the slide assembly in this position, a lock screw 37 is attached to the upper portion 27 of the slide assembly 28 such that screw 27 presses against the back wall 22 to prevent movement of the upper portion 27 away from inner surfaces 23 and 24 of the u-shaped trackway. The lower portion 32 is pivoted about a pivot point formed by the junction of lower portion 32 and bend 30, so that tab 34 cannot be removed from slot 26. Normally, the weight of the television on the tray base 12 is adequate to maintain the upper portion 27 against the inner portion of the u-shaped track 23. The lock screw 37 merely ensures that movement of the television set to adjust its position on tray base 12 does not inadvertently cause the tab 34 to escape from slot 26. Lock screw 37 may be fitted with a conventional theft resistant screw head known as security screws having a head configuration which requires a special tool to assemble and remove as described in my prior U.S. Pat. No. 4,363,460. Alternatively, adjustment of the television set elevation from the floor may be desirable, since the device cannot be removed from the bracket. Accordingly, lock screw 37 may be adjustable with an ordinary screwdriver or even by hand, so that the occupant can make the adjustment. When lock screw 37 is moved away from the back plate 22, it becomes possible to lift the television tray 12 to causes the slide assembly to pivot about the junction of bend 30 and lower portions 31 and 32. As shown in FIG. 6, when the arm 17a has been raised sufficiently, the lower portion 32a separates from the back plate 22 by angle α. Slot 26a no longer supports tab 34a and the slide assembly can be moved in the vertical direction, aided by low friction plastic bumpers 35a. Upper portion 27a is clearly spaced from the inner face of u-shaped track 24 and the vertical position of the television set can then be selected. Lowering the tray base causes the slide assembly to pivot about the junction of 30a to 32a to return to the position shown by arm 17 in FIG. 6. Tab 34 is once again inserted into one of the row of slots 26 and the weight of the television set causes the slide assembly to be secure. For safety sake, lock screw 37 can be inserted to maintain the stable condition.

Figure 7:
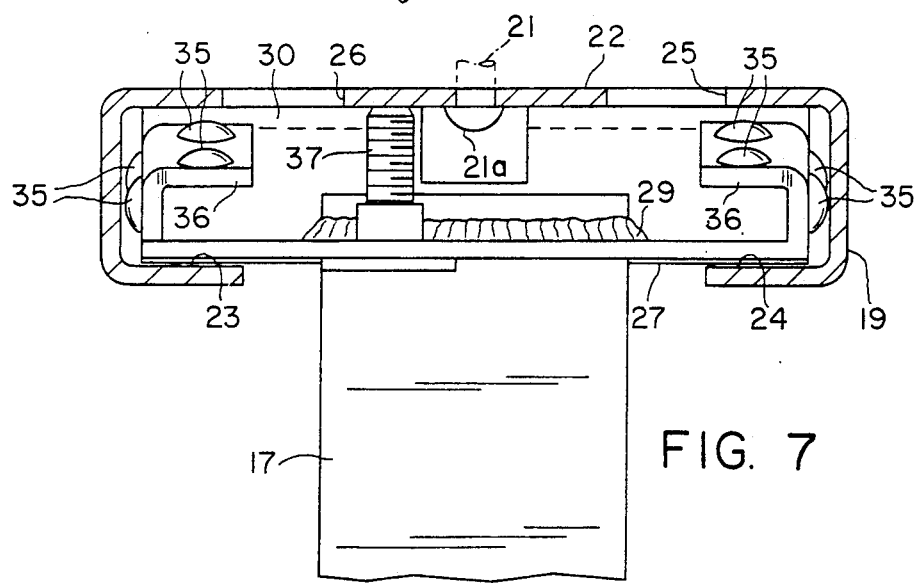

As shown in FIG. 7, the arm 17 is fitted to upper portion 27 through welds 29. Lock screw 37 bears against a back plate 22 to prevent movement as previously described. The base plate 38 has a notch which can be seen both in FIG. 7 and in FIG. 5 to permit clearance from fastening members 21 such as screw head 21a which extends into the space between lower portions 31 and 32.

While particular embodiments of the present invention have been illustrated and described herein, it is not intended to limit the invention and changes and modifications may be made therein within the scope of the following claims.

What is claimed is:

1. A wall bracket mounting device for attaching a television set to a wall, comprising:
   an elongated bracket adapted to be mounted on a wall, the elongated bracket including a flat back plate having at least one row of locking elements formed therein and a pair of U-shaped confronting channels extending along opposite side edges thereof defining trackways of a predetermined width with a pair of vertical inner track surfaces spaced from said back plate; and a rigid slide assembly including a rigid angled member having a rigid lower flat portion, a middle juncture position, and a rigid upper flat portion parallel to and forwardly spaced from said lower flat portion and an elongated support arm projecting outwardly from the middle juncture portion, wherein said rigid slide assembly is engageable within said pair of U-shaped confronting channels and operable between a first position wherein said upper flat portion is rotated toward the back plate with the lower flat portion rotated away and disengaged from the back plate such that the rigid slide assembly may be adjusted vertically in the elongated bracket and a second position wherein said lower flat portion of said rigid slide assembly contacts said back plate and said upper flat portion of said rigid slide assembly contacts said pair of vertical inner track surfaces so as to lock the rigid slide assembly in a predetermined position, the locking of said rigid slide assembly against vertical movement provided by the pivotal movement of said rigid slide assembly about the intersection defined by the support arm and the vertical longitudinal axis of the rigid slide assembly to enable engagement of the rigid slide assembly with the elongated bracket such that pivoting of said rigid slide assembly with respect to said elongated bracket being the only means necessary for adjusting movement of said rigid slide assembly in said elongated vertical bracket.

2. The device of claim 1 wherein said support arm is generally rectangular in cross section.

3. The device of claim 1 wherein said rigid slide assembly includes low friction contact points for contacting said elongated bracket.

4. The device of claim 1 wherein said locking elements includes a plurality of rows of slots on said back plate in position to cooperatively support tab means on said rigid slide assembly when said lower flat portion is in contact with said back plate.

5. The device of claim 1 wherein said elongated bracket is mounted to said wall with a plurality of fastening means positioned on a vertical line centered between a pair of rows of slots descending vertically along the back plate.

6. The device of claim 1 wherein said lower flat portion of said angled member includes two portions with tabs extending toward said back plate, said two portions defining an open space there between to avoid contact with said locking elements, and said back plate has a plurality of slots to receive said tab said various predetermined vertical heights.

7. The device of claim 1 which further includes adjustable engaging means to maintain said upper portion in contact with said inner track surfaces.

8. The device of claim 7 wherein said adjustable engaging means includes a locking screw threaded through the upper portion of said rigid slide assembly for contact with the back plate of said bracket when said locking screw is extended.

9. The device of claim 1 which further includes a bottom support means for preventing movement of said rigid slide assembly through the bottom of said Bracket.

10. The device of claim 1 wherein said upper flat portion includes a support member positioned to contact said back plate when said upper portion is pivoted away from said inner track surfaces to limit the distance which said upper flat portion can be moved away from said inner track surfaces.

11. The device of claim 10 wherein said support member include bumper means for providing reduced friction sliding movement when said support members are in contact with said back plate.

* * * * *